United States Patent [19]
Cao

[11] Patent Number: 6,130,766
[45] Date of Patent: Oct. 10, 2000

[54] POLARIZATION MODE DISPERSION COMPENSATION VIA AN AUTOMATIC TRACKING OF A PRINCIPAL STATE OF POLARIZATION

[75] Inventor: Xiang-Dong Cao, Boynton Beach, Fla.

[73] Assignee: Qtera Corporation, Boca Raton, Fla.

[21] Appl. No.: 09/226,835

[22] Filed: Jan. 7, 1999

[51] Int. Cl.$^7$ .................................................. H04B 10/00
[52] U.S. Cl. ......................... 359/161; 359/122; 359/156
[58] Field of Search ................................ 359/122, 156, 359/161, 110

[56] References Cited

U.S. PATENT DOCUMENTS

| | | | |
|---|---|---|---|
| 5,659,412 | 8/1997 | Hakki ........................................ | 359/156 |
| 5,822,100 | 10/1998 | Robinson et al. ....................... | 359/161 |
| 5,859,939 | 1/1999 | Fee et al. ................................. | 359/156 |

OTHER PUBLICATIONS

B. W. Hakki, "Polarization Mode Dispersion Compensation by Phase Diversity Detection", IEEE Photonics Technology Letters, vol. 9, No. 1, Jan. 1997, pp. 121–123.

Article entitled "Polarization Mode Dispersion: Fundamentals and Impact on Optical Communication Systems" by F. Heismann, *European Conference on Optical Communication (ECOC'98)* vol. 2, pp. 51–79, 1998.

Article entitled "Finer–Based Distributed PMD Compensation at 20 GB/S" by R. Now et al., 1993, *Europan Conference on Optical Communication (ECOC'98)*, vol. 3, pp. 157–159, 1998.

Article entitled "Electronic Equalization of Fier PMD–Induced distortion at 10 Gbit/s" by H. Bulow et al., *Optical Fiber Communication Technical Digest (OFC'98)*, pp. 151–152, 1998.

*Primary Examiner*—Kinfe-Michael Negash
*Attorney, Agent, or Firm*—Irwin Ostroff; Erwin W. Pheifle

[57] ABSTRACT

A polarization mode dispersion (PMD) compensator compensates for PMD in an optical signal by an automatic tracking of a principal state of polarization (PSP). A polarization controller (PC) receives a dithering optical signal including first and second principal states of polarization (PSPs) and PMD distortion received by the PMD compensator. The PC transforms the first and second PSPs into linearly polarized components, and is responsive to a feedback control signal for aligning the linearly polarized first and second PSPs to first and second polarization axes of the PBS, respectively. A polarization beam splitter (PBS) directs first polarized components of the received dithering optical signal onto a first output path, and directs second orthogonally polarized components of the received dithering optical signal onto a second output path for transmission as a PMD compensator output signal. A compensation control arrangement is responsive to both the received dithering optical signal and the first polarized components from the PBS for measuring interference characteristics of the two PSPs, and for generating the feedback control signal to the PC for aligning each of the PSPs with a corresponding one of first and second polarization axes of the PBS based on the measured interference characteristics.

34 Claims, 4 Drawing Sheets

POLARIZATION MODE DISPERSION COMPENSATION VIA AN AUTOMATIC TRACKING OF A PRINCIPAL STATE OF POLARIZATION

FIELD OF THE INVENTION

The present invention relates to method and apparatus for providing polarization mode dispersion compensation in high-speed optical transmission networks and systems.

BACKGROUND OF THE INVENTION

Polarization mode dispersion (PMD) has become one of the most important limiting factors for high-speed optical communication systems, especially for existing optical networks. The existing optical fiber networks have poor PMD characteristics with the PMD ranging from 0.5 to 2 ps/km$^{1/2}$, corresponding to transmission distances of 400 km down to 25 km for 10 Gbit/s systems. As optical networks evolve, it is highly desirable to transport data over long distance. For example, long distance transmission is crucial for four-fiber bidirectional line switched rings (BLSRS) since the protection path can be as long as the whole optical ring. Therefore, PMD compensation has become an urgent issue for high-speed optical communication systems. Although new fiber networks have better PMD performance and can support 10 Gbit/s transmission over reasonably long distance, PMD will become a limiting factor for 40 Gbit/s transmissions. As the capacity demands keep increasing, it is desirable to increase the bit-rate from 10 Gbit/s to 40 Gbit/s. Therefore, PMD compensation is very important not only for existing optical fiber networks, but also for the new optical fiber networks. However, unlike chromatic dispersion, PMD is statistical in nature, which makes it extremely challenging to compensate for waveform distortion caused by PMD.

For a laser source with narrow bandwidth, there will be two polarization modes for a single mode fiber. There is a group delay between these two eigen-modes, also known as the principal states of polarization (PSP). If the input polarization is aligned with one of the PSPs, then the output polarization will remain in the same PSP. In other words, there will be no waveform distortion if the input polarization is lined up with one of the PSPs. However, for arbitrary input polarizations, the output will consist of both PSPs with a certain amount of group delay between them. It is this differential group delay (DGD) that causes waveform distortion. In order to compensate for PMD, it is necessary to find the PSPs at the output so that a polarization splitter can be used to separate the two PSPS.

In the prior art, there are three categories of techniques are used for PMD compensations. They are: (a) all-optical, (b) all electrical, and (c) hybrid. For all-optical PMD compensation, the restoration of PMD distortion is done optically without any optical-electrical conversion. The signal remains in the optical domain. Normally, all-optical PMD compensators consist of a polarization controller, a pair of polarization beam splitters (PBSs), and either a continuous delay line or a discrete delay line such as a piece of high-birefringence optical fiber. The basic concept is to find the PSPs and align their axes to those of the PBSs. A PMD detection mechanism is then used to measure the Differential Group Delay (DGD) as the feedback signal, which is used to adjust the delay line so that the DGD is reduced to minimum. There are several different ways of measuring DGD.

In the article entitled "Polarization Mode Dispersion: Fundamentals and Impact on Optical Communication Systems" by F. Heismann, European Conference of Optical Communication (ECOC'98), Vol. 2, pages 51–79, (1998), high-speed electronics are used to measure the electrical spectrum content at specific frequencies, and then the spectral information is correlated with the DGD value. In the article entitled "Fiber-Based Distributed PMD Compensation at 20 GB/S" by R. Neo et al., European Conference of Optical Communication (ECOC'98), Vol. 3, pages 157–159, (1998), there is disclosed 77 ps Polarization Mode Dispersion (PMD) compensation for a transmission system at a speed of 20 Gbit/s using an improved RF spectrum analysis. In the article entitled "Electronic equalization of fiber PMD-induced distortion at 10 Gbit/s" by H. Bulow et al, Optical Fiber Communication (OFC'98), pages 151–152, (1998), there is demonstrated that 90 ps DGD can be compensated for by using an all-electrical method for a 10 Gbit/s system. In the all-electrical method, the distorted optical signal is converted to electrical signal at the receiver. A delay line filter with specific weights is used to partially compensate for the distortion due to PMD.

Hybrid PMD compensation is a technique that uses both optical and electrical methods to restore the distortion due to PMD. In the article entitled "Polarization Mode Dispersion Compensation by Phase Diversity Detection" by B. W. Hakki, IEEE Photonics Technology Letters, Vol. 9, No. 1, pages 121–123, January 1997, a hybrid PMD compensation technique is disclosed wherein a polarization controller (PC) and a polarization beam splitter (PBS) are used to transform the states of polarization, and split the polarization components. At each output of the PBS, a high-speed photodetector converts the optical signal to electrical signal. An electrical delay line is used to adjust the phase delay between the two electrical signals.

There are both advantages and disadvantages for each of above mentioned techniques. For the all-optical PMD measurement technique, the usage of an optical delay line, as well as the usually complicated optical PMD measurement result in high insertion loss, and more importantly, slow compensation speed. On the other hand, the usage of a mechanical delay line raises a question of reliability. The requirement of a PMD measurement makes the compensation process relatively slow. The statistical nature of PMD also makes a high accuracy PMD measurement very difficult. On the other hand, the physical size requirement does not allow the usage of a fully featured PMD measuring device.

The electronic PMD measurement technique, using RF spectral information, suffers from laser chirp induced RF spectrum distortion, as well as distortion induced by optical fiber nonlinearity. As for all-electrical method, the finite number of delay lines makes this kind of PMD compensator good only for some specific values of Differential Group Delay (DGD). The compensation is normally partial. It evolves a high-speed electronics design, which complicates the functionality of receiver. The hybrid method also requires expensive high-speed electronics, as well as a pair of high-speed optical detectors. Both electronic and hybrid solutions are bit-rate dependent, as well as transmission format dependent.

It is desirable to provide a polarization mode dispersion compensation arrangement which (a) provides a simple optical design including a fast digital signal processing technique with low insertion loss and high compensation speed, (b) is wavelength and bit-rate independent and has no limitation on the compensation range for PMD values, (c) provides noise reduction, (d) has no mechanical moving part, and (e) is transmission format independent.

SUMMARY OF THE INVENTION

The present invention is directed to method and apparatus for providing polarization mode dispersion compensation in high-speed optical networks and systems which use automatic tracking of the principal states of polarization of a received optical signal.

Viewed from one aspect, the present invention is directed to a polarization mode dispersion (PMD) compensation arrangement in an optical transmission system comprising a polarization beam splitter (PBS), a polarization controller (PC), and compensation control means. The polarization beam splitter (PBS) comprises a first polarization axis for directing first polarized components of a received dithering optical signal onto a first output path, and a second polarization axis for directing second orthogonally polarized components of the received dithering optical signal onto a second output path for transmission as an output signal from the PMD compensation arrangement. The polarization controller (PC) is coupled to receive the dithering optical signal including first and second principal states of polarization (PSPs) and PMD distortion received by the PMD compensation arrangement. The PC transforms the first and second PSPs into linearly polarized components, and is responsive to a feedback control signal for aligning the linearly polarized first and second PSPs to the first and second polarization axes of the PBS. The compensation control means is responsive to both the dithering optical signal received by the PMD compensation arrangement and the first polarized components received on the first output path from the PBS for measuring interference characteristics of the two PSPs. In response to the interference characteristic measurement, the compensation control means generates the feedback control signal to the PC for aligning each of the linearly polarized PSPs with a separate one of the first and second polarization axis of the PBS based on the measured interference characteristics.

Viewed from another aspect, the present invention is directed to a polarization mode dispersion (PMD) compensation arrangement in an optical transmission system comprising an optical tap, a polarization beam splitter (PBS), and compensation control means. The optical tap is responsive to the reception of a dithering optical signal from a remote transmitter including polarization mode dispersion (PMD) comprising first and second orthogonal principal states of polarization (PSPs) for directing a first portion of the received dithering optical signal onto a first output path and a second portion of the received dithering optical signal onto a second output path. The polarization beam splitter (PBS) is coupled to receive the second portion of received signal from the optical tap, and comprises a first polarization axis for directing first polarized signals onto a first output path, and a second polarization axis for directing second orthogonally polarized signals onto a second output path for transmission as an output signal from the PMD compensation arrangement. The compensation control means is responsive to both the first portion of the received dithering optical signal on the first output path from the optical tap and the first polarized signals on the first output path from the PBS for measuring interference characteristics of the two principal states of polarization. In response to such measurement, the compensation control means aligns each of the principal states of polarization in the received dithering optical signal on the second output path from the optical tap with the corresponding first and second polarization axes of the PBS based on the measured interference characteristics.

Viewed from still another aspect, the present invention is directed to a method of providing polarization mode dispersion (PMD) compensation in an optical transmission system. In a first step, a dithering optical signal is received including first and second orthogonal principal states of polarization (PSPs) that have been subjected to polarization mode dispersion. In a second step, the first and second orthogonal (PSPS) in the received dithering optical signal from the first step are transformed into first and second linearly polarized components in a polarization controller (PC). In a third step, all linearly polarized components which are aligned with a first polarization axis of a polarization beam splitter (PBS) are directed to a first optical input of a compensation control means, and all linearly polarized components which are aligned with a second polarization axis of the polarization beam splitter (PBS) are directed as an optical output signal to a remote user device. In a fourth step, interference characteristics and amplitude fluctuations are measured in polarized components obtained in the third step via the first polarization axis of the PBS in the compensation control means for generating a feedback control signal to the PC. In a fifth step, the PC is caused to realign the first and second linearly polarized components to match the first and second polarization axes of the PBS in response to the feedback control signal from the fourth step.

The invention will be better understood from the following more detailed description taken with the accompanying drawings and claims.

DETAILED DESCRIPTION

Figure 1:
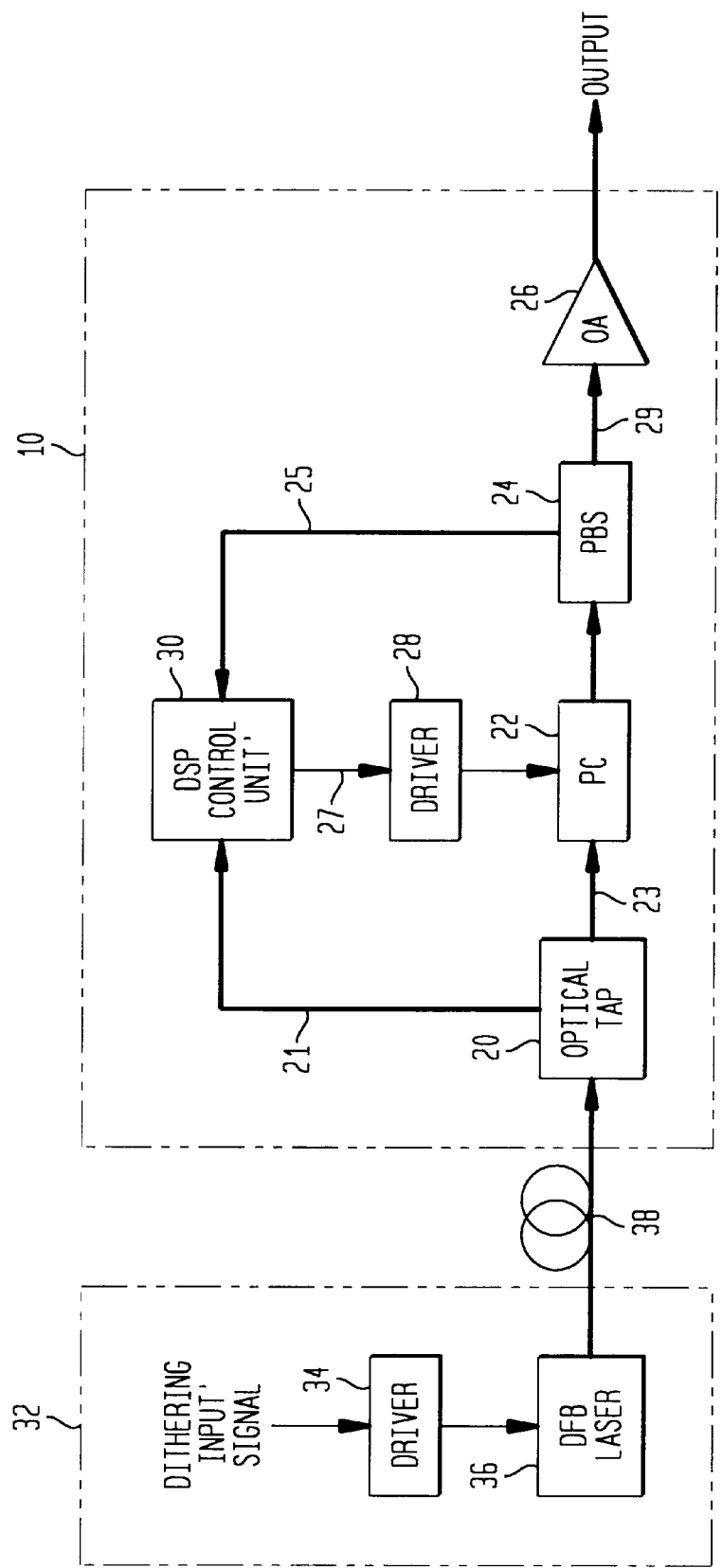
FIG. 1 shows a block diagram of a principal state polarization (PSP) tracking arrangement 10 for providing polarization mode dispersion (PMD) compensation in an optical transmission system in accordance with the present invention.

Referring now to FIG. 1, there is shown within a dashed line rectangle a block diagram of a principal state polarization (PSP) tracking arrangement 10 for providing polarization mode dispersion (PMD) compensation in an optical transmission system in accordance with the present invention. The principal state polarization tracking arrangement 10 comprises an optical tap 20, a fast polarization controller (PC) 22, a polarization beam splitter (PBS) 24, an optical amplifier (OA) 26, a driver 28, and a digital signal processing (DSP) control unit 30. The optical tap 20 is coupled to receive a dithering optical signal from a remote transmitter 32 (shown within a dashed line rectangle) via a single mode optical fiber 38. The optical tap 20 directs a first portion of the received optical signal to a first input of the PC 22 via an optical fiber 23, and directs a remaining second portion of the received optical signal to a first input the DSP control unit 30 via an optical fiber 21. The PC 22 is also coupled to receive an electrical feedback control signal from the driver 28 at a second input thereof. An output from the PC 22 is coupled to an input of the polarization beam splitter (PBS) 24. A first optical output of the PBS 24 is coupled to a second input of the DSP control unit 30 via an optical fiber 25, and a second optical output from the PBS 24 is coupled to the optical amplifier (OA) 26 via an optical fiber 29. An output from the OA 26 is the output from the PSP tracking arrangement 10. The remote transmitter 32 comprises a driver 34 responsive to a dithering input signal for generating a dithering output driving voltage to a distributed feedback (DFB) laser 36 in accordance with the present invention.

In operation, an electrical dithering input signal is generated at the transmitter 32 which is dithered at a low speed as, for example, any frequency from 10 KHz to 1 MHz. This electrical dithering input signal is used by the driver 34 to generate an electrical dithering output control signal to the DFB laser 36. The DFB laser 36 is responsive to the electrical dithering output control signal from the driver 34 for generating a dithering optical output signal having its frequency dithered at the above-mentioned low speed for transmission over the single-mode optical fiber 38. The dithering optical output signal propagating on optical fiber 38 contains two orthogonally polarized principal state of polarizations (PSPs). Due to the path difference that the two PSPs take over the optical fiber 38, a phase difference occurs between the PSPs when reaching the PSP tracking arrangement 10. The general task of the PSP tracking arrangement 10 is to find the PSPs, and align them to the axes of the polarization beam splitter (PBS) 24.

In the PSP tracking arrangement 10, the optical tap 20 divides the received dithering optical signal into a first portion for transmission over optical fiber 21 to a first input of the DSP Control unit 30, and into a second portion for transmission over optical fiber 23 to a first input of the fast polarization controller (PC) 22. The PC 22 is driven by a feedback control signal received at a second input thereof which is generated in the DSP Control unit 30 and provided via the driver 28. It is to be understood that because of characteristics of the optical fiber 38, the PSP components are not necessarily linearly polarized when they arrive at the PSP tracking arrangement 10, and could be either elliptically or circularly polarized. The polarization controller 22 transforms the two orthogonal PSP components in the optical signal received via optical fiber 23 into two linearly polarized components. Still further, the polarization controller 22 aligns these linearly polarized components to the axes of the polarization beam splitter (PBS) 24 under the control of the feedback control signal from the DSP Control unit 30 via the driver 28. The resulting optical signal from the PC 22 is coupled to an input of the PBS 24 which splits the linearly polarized components into two separate output signals. A first output of the PBS 24 is coupled to a second input of the DSP control unit 31 via optical fiber 25. A second output of the PBS 24 is coupled via an optical fiber 29 to an input of the optical amplifier 26. When the two linearly polarized components from the PC 22 are aligned with the axes of the PBS 24, each linearly polarized component will be coupled to a separate one of the first and second output of the PBS 24. When the two linearly polarized components from the PC 22 are not aligned with the axes of the PBS 24, then a part of each linearly polarized component will be coupled to a separate one of the first and second output of the PBS 24. The optical amplifier 26 is responsive to the optical signal received from the PBS 24 via optical fiber 29 for generating a constant power optical output signal for transmission to a remote user device (not shown) such as an optical receiver.

The DSP control unit 30 processes the first and second input signals from the optical tap 20 and the PBS 24, respectively, and generates a feedback signal to the PC driver 28 for use by the PC 22. The combination of the DSP control unit 30, the PC driver 28, and the PC 22 can be referred to as a compensation control means. More particularly, polarization mode dispersion (PMD) occurs during optical transmissions over the optical fiber 38. By dithering the optical transmission signal, information of the PMD is carried by the dithering portion of the optical signal. Such dithering signal can be, for example, sinusoidal or a square wave. Therefore, the frequency of the transmitted optical signal is increasing and decreasing and is associated with each PSP since the PSPs each travel at different speeds down the optical fiber 38 and experience some slight phase shift. The phase shift depends on the amount of PMD distortion. Therefore, by monitoring the interference between the PSP components in the DSP control unit 30, once the input signal has been transformed linearly polarized components by the PC 22, it can be determined whether the axes of the PSPs are aligned, or not, with the axes of the PBS 24. In response to such determination, the DSP control unit 30 generates an appropriate feedback control signal to the PC 22 to reorient and align the linearly polarized PSP components of the received optical signal to the axes of the PBS 24.

In the PSP tracking arrangement 10, the polarization controller (PC) 22 will preferably comprise three equivalent optical wave-plates to achieve endless polarization tracking. In such design, there are two quarter wave-plates (not shown) and one-half wave-plate (not shown) cascaded in such an order that the half wave-plate is placed between the two quarter wave-plates. Although it is possible to achieve arbitrary polarization transformation using one quarter and one half wave-plates, it is desirable to use three wave-plates so that continuous polarization adjustment can be achieved. The PC 22 can be made of lithium niobate waveguide, squeezed optical fiber, or liquid crystals. The principles of operation is the same regardless of what kind of material is used.

As was stated above, due to the path difference that the two PSPs take over the optical fiber 38, there will be a phase difference between the PSPs when reaching the PSP tracking arrangement 10. After passing through the PBS 24, the two principle state polarizations (PSPs) will interfere with each other if the PSPs are not aligned to the axes of the PBS 24. Since the phase difference is a function of the frequency of the DFB laser 36 at the transmitter 32, the interfering laser fields will oscillate at the dithering frequency. However, if the PSPs are aligned with the axes of the PBS 24, there is one component at each output of the PBS 24, and thus there is no interference. Therefore, by monitoring the interference at the DSP control unit 30, the two PSPs can be aligned to the axes of the PBS 24. To monitor the interference, a photodetector (shown in FIG. 2) can be used which measures the intensity of the optical field received over each of the optical fibers 21 and 25. As a consequence, the interference signal after the photodetector will be oscillating at twice the speed of the laser dithering speed. PSP tracking can then be accomplished by minimizing the interference component as will be explained hereinafter.

Figure 2:
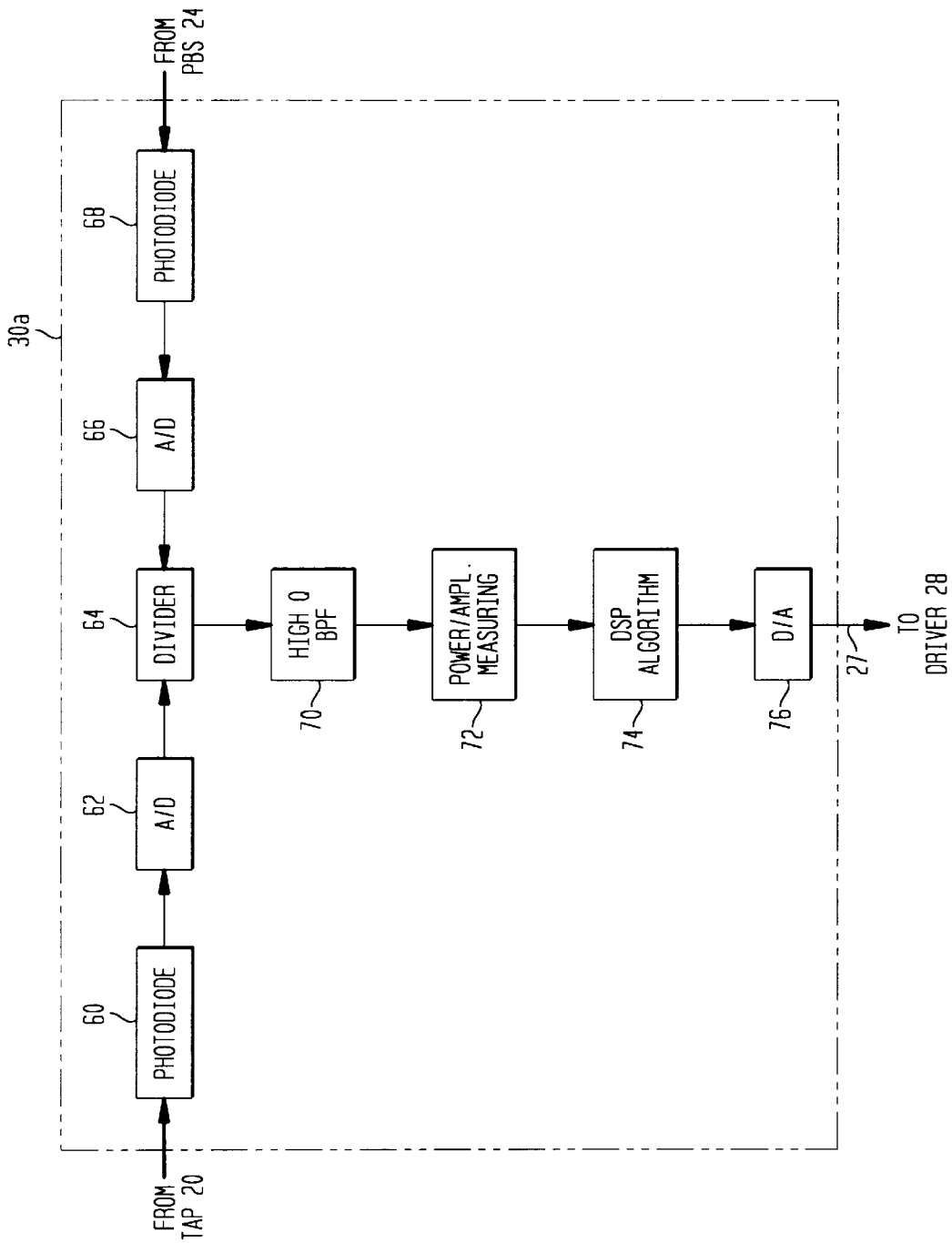
FIG. 2 shows a block diagram of a preferred arrangement of a digital signal processing control unit in the principal state of polarization tracking arrangement of FIG. 1 in accordance with the present invention.

Referring now to FIG. 2, there is shown a block diagram of a preferred arrangement of a digital signal processing (DSP) control unit 30a useful as the DSP control unit 30 in the principal state polarization (PSP) tracking arrangement 10 of FIG. 1 in accordance with the present invention. The DSP control unit 30a comprises first and second photodiodes 60 and 68, first and second Analog-to-Digital (A/D) converters 62 and 66, a divider 64, a High Q band pass filter (HIGH Q BPF) 70, a Power or Amplitude Measuring device (POWER/AMPL. MEASURING) 72, a Digital Signal Algorithm (DSP ALGORITHM) calculating device 74, and a Digital-to-Analog (D/A) converter 76. The output signal from the optical tap 20 (shown in FIG. 1) is coupled to an input of the first photodiode 60. An output from the first photodiode 60 is coupled to a first input of the divider 64 via the first A/D converter 62. The output signal from the Polarization Beam Splitter (PBS) 24 (shown in FIG. 1) is coupled to an input of the second photodiode 68. An output from the second photodiode 68 is coupled to a second input of the divider 64 via the second A/D converter 66. An output of the divider 64 is coupled to an input of the Power or Amplitude Measuring device 72 via the High Q bandpass filter 70. An output from the Power or Amplitude Measuring device 72 is coupled to an input of a digital signal processing (DSP) algorithm calculating device 74. An output from the DSP algorithm calculating device 74 is coupled to an input of the digital-to-analog converter 76 which generates an analog control signal at its output that is coupled to a second input of the PC driver 28 (shown in FIG. 1).

In operation, the signal from the optical tap 20 includes all of the amplitude fluctuations at both the fundamental and the second harmonic frequencies of the transmitter's laser dithering frequency, but does not itself contain interference information. The signal from the PBS 24 contains two parts, the interference resulting from the misalignment of the Principle State Polarizations (PSPs), and the same amplitude fluctuations as detected by the optical tap 20. In order to use a high-speed Digital Signal Processing chip, all of the input signals have to converted from an analog to digital (A/D) format before any further signal processing occurs. Many DSP chips have built in A/D and D/A converters. However, it is necessary in the DSP control unit 30a to use separate A/D and D/A converters with higher resolutions. If the laser dithering signal is a single tone sinusoidal signal, then the signal from the optical tap 20 will not have frequency components at harmonic frequencies so that any second harmonic component of the signal from the PBS 24 has only one contribution, that is the interference between the PSPs. In this case, the power or amplitude of the second harmonic component of signal from the PBS 24 can be used as an error signal to be fed back to the Polarization Controller (PC) driver 28 in such a way that the error signal is minimized by reorienting the PSPs in the PC 22. However, the dithering waveform can be a square wave, as used commonly for suppression of stimulated Brillouin scattering (SBS). On the other hand, the polarization dependent loss (PDL) of the transmission line will cause harmonic distortion, which interferes with the feedback signal from the PBS 24. The digital divider 64 is used to separate the harmonic distortion of either the laser dithering waveform, or the PDL, from the interfering signal of the two PSPs. Therefore, the output of the divider 64 will contain only the PSPs interfering information. The high Q band-pass filter 70 is used to filter out, or pass, the second harmonic component generated by the interference of two PSPs. The first and second photodiodes 60 and 69 have built-in, low-noise, amplifiers (not shown) with low-pass filters (LPFs) (not shown). These photodiode amplifiers are preferably trans-impedance amplifiers with a proper gain to drive the first and second A/D converters 62 and 66. The photodiode LPFs are used to reduce the high-frequency noise, and more importantly to eliminate the high-frequency aliasing effects due to the digital sampling.

The power or the amplitude of the second harmonic signal passed by the high Q BPF 70 can be easily calculated in the digital domain within the Power/Amplitude Measuring device 72. Digital Signal Processing has the advantage of fast signal processing, especially for determining the power or amplitude of a narrow band sinusoidal signal. An integrator (not shown) would be used to determine the power if an analog circuit were used. To achieve reasonable accuracy, many cycles of integration are necessary, which greatly limits the response time of over-all Polarization Mode Dispersion (PMD) compensation. However, a simple DSP algorithm can accomplish this task with a much faster speed. The steps of a method for implementing the DSP algorithm are as follows:

(1) Sending the data stream signal at the output of the high Q BPF 70 to a buffer (not shown) in the DSP algorithm device 74.

(2) Retrieving two copies (sets) of the data stream from the buffer with a delay of 90 degrees between these two sets of data. In mathematical form, the equations D1=Acos(2wt+θ), and D2=Asin(2wt+θ) are used, where A is the amplitude, θ is the arbitrary phase, and w is the laser dithering frequency.

(3) Multiplying D1 by D2, and filtering out the DC component of the product. This is denoted by the equation D=(D1)(D2). After a simple calculation, it is found that $D=0.5A^2+0.5A^2 \sin(4wt+2\theta)$. After filtering is accomplished, $D=0.5A^2$, which is the power of the sinusoidal signal.

The DSP control algorithm for the over-all PSP tracking is defined by the following steps:

(1) Calculate the power or amplitude of the second harmonic component, designated as P-new.

(2) Save it to a new variable, designated as P_old.

(3) Increase (or decrease) the driving signal from the PC driver 28 (shown in FIG. 2) to the polarization controller (PC) 22.

(4) Measure P_new again.

(5) If P_new>P_old, then decrease (or increase) the driving signal from the PC driver 28 to the polarization controller (PC) 22.

(6) Repeat steps (1)–(5).

In short, the PC driving voltage from the driver 28 is controlled in such a way that the measured power or amplitude of the second harmonic signal is always minimized.

The DSP feedback control unit 30 in the principal state of polarization (PSP) tracking arrangement 10 is designed in such a way that both fast response and noise suppression is achieved using fast digital signal processing technology. This design does not include any moving mechanical components, which is very different from prior art techniques of Polarization Mode Dispersion (PMD) compensation where mechanical delay lines are used. Elimination of mechanical delay lines with the present design makes the tracking arrangement 10 more reliable, faster, and physically smaller. From an optical performance of point of view, it also provides partial optical noise reduction. Since the amplified spontaneous emission (ASE) noise is unpolarized, the transmitted ASE noise will always be reduced by half. However, since only the more powerful PSP component is selected to pass through the device, the reduction in its optical power is always less than half. In other words, there is always an improvement in the optical signal-to-noise ratio (OSNR). More particularly, the PSP with the larger amplitude will automatically be passed through the second output port of the PBS 24 towards the optical amplifier 26 shown in FIG. 1. This occurs because a second harmonic received by the DSP Control unit 30 is always minimized by the DSP Control unit 30 for providing a feedback control signal to the PC 22. Although the tracking arrangement 10 is designed to work for a single wavelength channel, it can be used for any arbitrary wavelength. In other words, there is no need to provide a spare or different PMD compensator arrangement for each wavelength channel. On the other hand, the tracking arrangement 10 is bit-rate independent. It works for OC48, OC192, and OC768 transmission systems. This is an important advantage compared to other techniques where a different electronic design is required for different transmission bit-rates.

Figure 3:
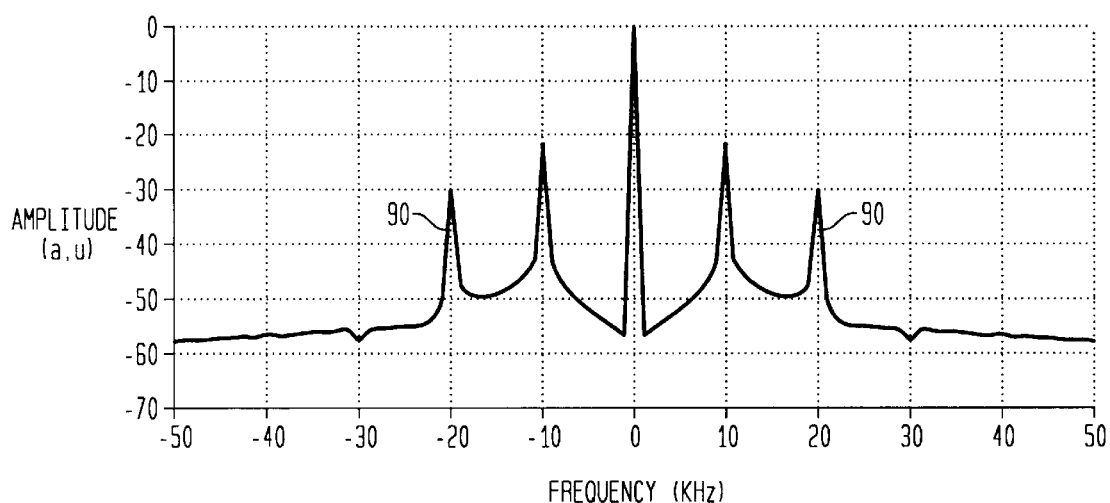
FIG. 3 graphically shows a spectrum of an electrical signal illustrating second order harmonics when axes of the principal state of polarization is not aligned with axes of a polarization beam splitter in the tracking arrangement of FIG. 1.
Figure 4:
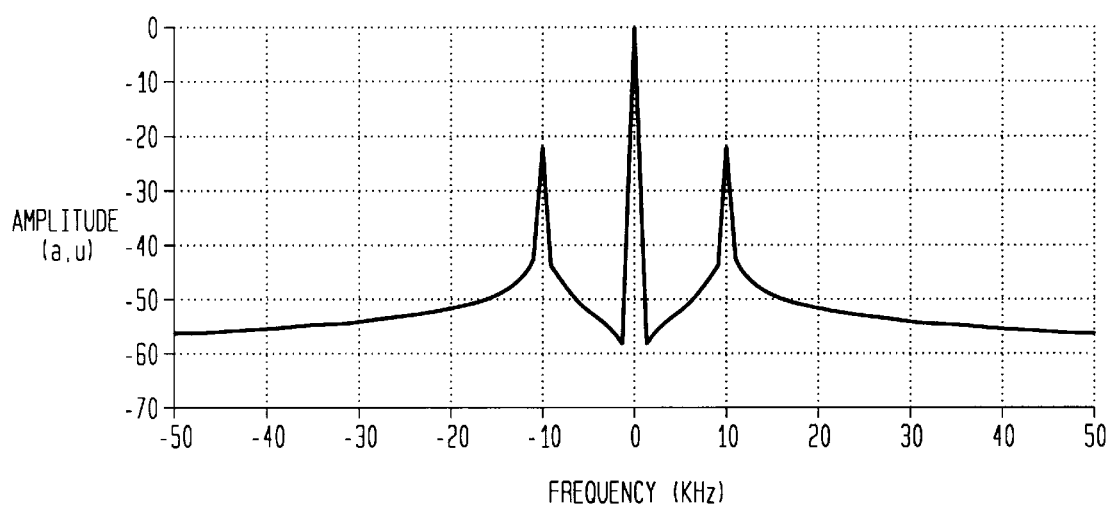
FIG. 4 graphically shows a spectrum of an electrical signal illustrating a lack of second order harmonics when axes of the principal state of polarization are aligned with axes of a polarization beam splitter in the tracking arrangement of FIG. 1.
Figure 5:
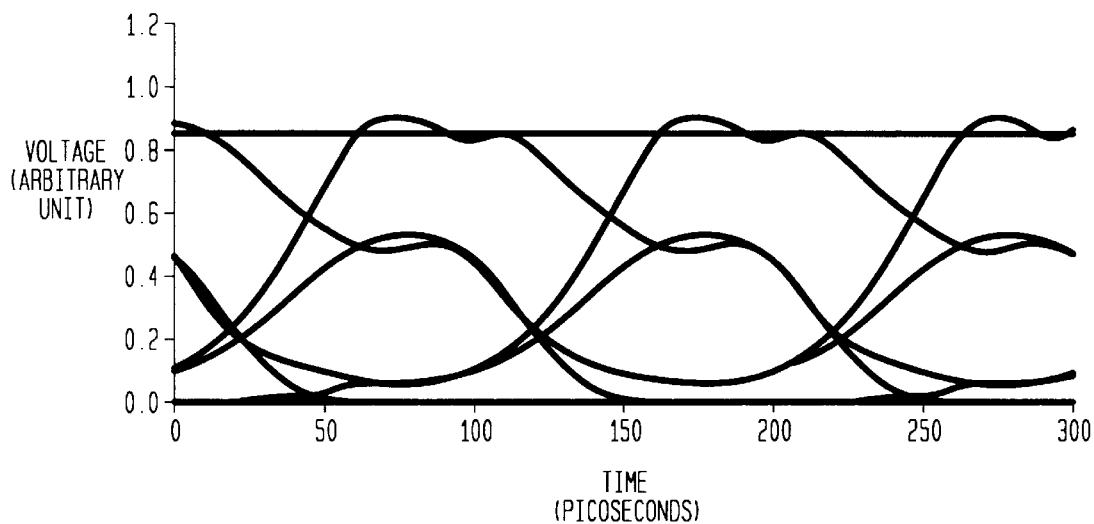
FIG. 5 graphically shows an eye-diagram of the electrical signal of FIG. 3 which include second order harmonics when the axes of the principal state of polarization is not aligned with axes of a polarization beam splitter in the tracking arrangement of FIG. 1.
Figure 6:
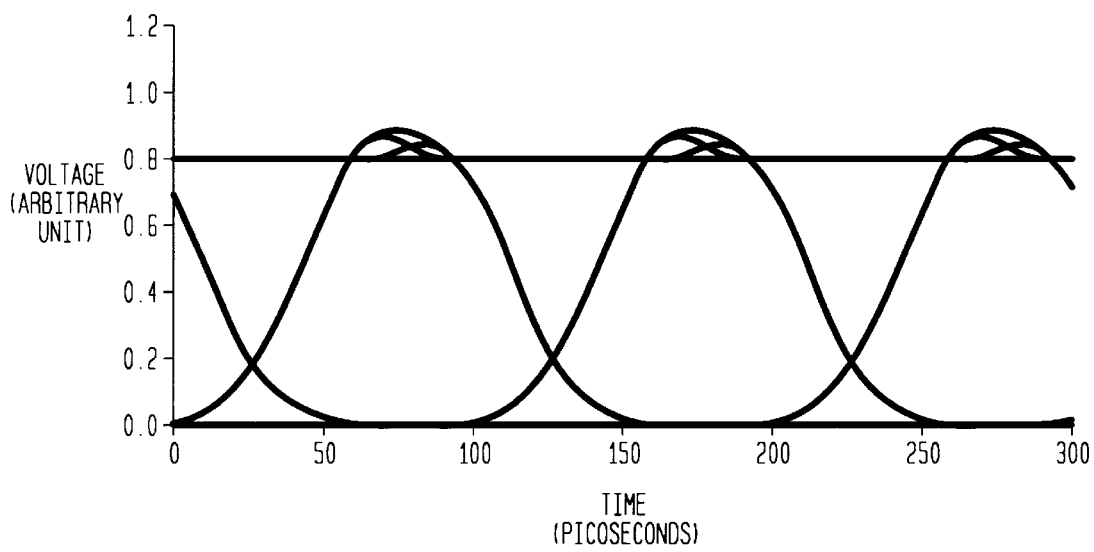
FIG. 6 graphically shows an eye-diagram of the electrical signal of FIG. 4 which do not include second order harmonics when the axes of the principal state of polarization is not aligned with axes of a polarization beam splitter in the tracking arrangement of FIG. 1.

Referring now to FIGS. 3–6, FIGS. 3 and 4 each graphically show a typical spectrum of amplitude versus frequency of electrical signals, and FIGS. 5 and 6 each graphically show corresponding eye-diagrams of an arbitrary voltage versus time in picoseconds to illustrate the principles of operation of the principal state polarization (PSP) tracking arrangement 10 of FIG. 1. The typical spectrum and eye-diagrams shown graphically in FIGS. 3–6 are presented for a 10 Gbit/s transmitter 32 (shown in FIG. 1) which is coupled to a single mode optical fiber 38 (shown in FIG. 1) with a Polarization Mode Dispersion (PMD) value of 90 ps. Still further, the frequency of a distributed feedback (DFB) semiconductor laser 36 (shown in FIG. 1) at the transmitter 32 is dithered at a frequency of 10 KHz. A polarization controller (PC) 22 (shown in FIG. 1) comprises three wave-plates, one half wave-plate sitting between two quarter wave-plates. Each eye-diagram measurement is obtained at the end of the optical fiber transmission line 38. FIGS. 3–6 show that full signal recovery is obtainable with the tracking arrangement 10 of FIG. 1.

More particularly, FIG. 3 graphically shows the typical spectrum of the electrical signal, assuming a sinusoidal dithering waveform when the axes of the principal state polarizations (PSPs) are not aligned with the axes of the Polarization Beam Splitter 24 (shown in FIG. 1). The y-axis shows Amplitude (arbitrary unit) and the x-axis shows frequency (KHz). The frequency of the DFB laser 36 at the transmitter 32 is dithering at a frequency of 10 KHz with a peak-to-peak frequency change of 400 MHz, the bit rate of the transmission is 10 Gbit/s, and the Polarization Mode Dispersion (PMD) value of the optical transmission link 38 has the above-mentioned value of 90 ps. FIG. 5 graphically shows the corresponding eye-diagram for the optical output of the tracking arrangement 10 of FIG. 1 when the axes of the PSPs are not aligned with those of the Polarization Beam Splitter 24. The y-axis shows Amplitude (arbitrary unit) and the x-axis shows Frequency (KHz). The typical spectrum shown in FIG. 3 shows the second harmonics 90, and the optical eye-diagram of FIG. 5 shows the distortion due to PMD, when the axes of the PSPs are not aligned with those of the Polarization Beam Splitter 24.

In contrast, FIGS. 4 and 6 graphically show the spectrum of the electrical signal and the eye-diagram when the axes of the PSPs are aligned with those of the Polarization Beam Splitter 24 (shown in FIG. 1). No second order harmonic component appears in spectrum shown in FIG. 4, and the optical eye-diagram is fully recovered in FIG. 6 when implementing the tracking arrangement 10 shown in FIG. 1.

A new method for Polarization Mode Dispersion (PMD) compensation has been described using a fast PSP tracking arrangement 10 shown in FIG. 1 which is based on the interference characteristics of two principal states of polarization (PSP), and a technique of automatic tracking of the principal state of polarizations (PSPs). The DSP feedback control unit 30a shown in FIG. 2 is designed in such a way that both fast response and noise suppression is achieved using fast digital signal processing technology. This arrangement does not include any moving mechanical components, which is very different from other techniques of PMD compensation where mechanical delay lines are used. Elimination of mechanical delay lines of this design makes the present PSP tracking arrangement 10 more reliable, faster, and smaller. From an optical performance of point of view, it also provides partial optical noise reduction. Although the tracking arrangement 10 is designed to work for a single wavelength channel, it can be used for arbitrary wavelength. In other words, there will be no need to provide a spare or different PMD compensator for each wavelength channel. On the other hand, the PSP tracking arrangement 10 is bit-rate independent. The PSP tracking arrangement 10 works for OC48, OC192, and OC768 transmission systems. This is an important advantage compared to other techniques where a different electronic design is required for different transmission bit-rates. The detection scheme does not depend on the bit-rate, or the transmission format. It works for 10 Gbit/s, as well as 40 Gbit/s transmissions, and it works for a Non-Return-to Zero (NRZ) format, as well as a Return-to-Zero (RZ) format. Another important feature of the PSP tracking arrangement 10 is that it can compensate for any amount of PMD. Normally, the optical delay used by prior art PMD compensators is the limiting factor for the maximum allowable PMD value. Since no delay line is required in the present tracking arrangement 10, there is substantially no limit for the PMD compensating range. Due to the simple optical design, the insertion loss can be made very small so that it can be used without optical amplification.

In summary, the present PSP tracking arrangement 10 provides the advantages of (1) a simple optical design, (2) low insertion loss, (3) high compensation speed, (4) wavelength independence, (5) bit-rate independence, (6) no limitation on the compensation range for PMD values, (7) noise reduction, (8) no mechanical moving parts, (9) a fast digital signal processing technique, and (10) transmission format independence.

It is to be appreciated and understood that the specific embodiments of the present invention described hereinbefore are merely illustrative of the general principles of the invention. is Various modifications may be made by those skilled in the art which are consistent with the principles set forth. For example, digital signal processing has been described as a preferred use in the signal processing control unit 30 shown in FIG. 1 because it is very fast. However, where speed is not as critical, analog signal processing can alternatively be used to provide the same feedback control signal to the polarization controller 22.

What is claimed is:

1. In an optical transmission system, a polarization mode dispersion (PMD) compensation arrangement comprising:

a polarization beam splitter (PBS) comprising a first polarization axis for directing first linearly polarized components of a dithering optical signal received by the PMD compensation arrangement onto a first output path, and a second polarization axis for directing second orthogonally linearly polarized components of the received dithering optical signal onto a second output path for transmission as an output signal from the PMD compensation arrangement;

a polarization controller (PC) coupled to receive the dithering optical signal received by the PMD compensation arrangement including first and second principal states of polarization (PSPs) and PMD distortion, the PC transforming the first and second PSPs into linearly polarized components and being responsive to a feedback control signal for aligning the linearly polarized first and second PSPs to the first and second polarization axes of the PBS for transmission to the PBS; and compensation control means responsive to both the dithering optical signal received by the PMD compensation arrangement and the first polarized components on the first output path from the PBS for measuring interference characteristics of the PSPS, and generating the feedback control signal to the PC for aligning each of the linearly polarized PSPs with a separate one of the first and second polarization axes of the PBS based on the measured interference characteristics.

2. The PMD compensation arrangement of claim 1 wherein the compensation control means measures the level of second harmonics as the interference characteristics between the received dithering optical signal and the first polarized components received from the PBS for generating the feedback control signal to the PC.

3. The PMD compensation arrangement of claim 1 further comprising an optical tap responsive to the reception of the dithering optical signal from a remote transmitter including polarization mode dispersion distortion comprising first and second orthogonal principal states of polarization (PSPs) for directing a first portion of the received dithering optical signal onto a first output path to the compensation control means and a second portion of the received dithering optical signal onto a second output path to the polarization controller.

4. The PMD compensation arrangement of claim 3 wherein the compensation control means comprises:

a signal processing control unit responsive to both the first portion of the received dithering optical signal on the first output path from the optical tap and the first polarized signals on the first output path from the PBS for continually measuring the interference characteristics of the first and second principal states of polarization for generating the feedback control driving signal to the polarization controller.

5. The PMD compensation arrangement of claim 3 wherein the compensation control means comprises:

a digital signal processing control unit for generating an output control signal based on the measured interference characteristics of the first and second PSPs in the two received optical signal from the optical tap and the PBS; and a driver responsive to the output control signal from the digital signal processing control unit for generating the feedback control signal to the polarization controller.

6. The PMD compensation arrangement of claim 5 wherein the compensation control means further comprises:

a first photodiode responsive to the first portion of the received dithering optical signal on the first output path from the optical tap for generating a corresponding electrical output signal;

a first analog-to-digital (A/D) converter for converting the electrical output signal from the first photodiode into a digital output signal;

a second photodiode responsive to the first polarized signals on the first output path from the PBS for generating a corresponding electrical output signal;

a second analog-to-digital (A/D) converter for converting the electrical output signal from the second photodiode into a digital output signal; and a digital divider for separating harmonic distortion of the output signal from the first A/D converter which interferes with the output signal from the second A/D converter for generating an output control signal containing only the PSP interfering information.

7. The PMD compensation arrangement of claim 6 wherein the compensation control means further comprises:

power or amplitude measuring means for passing only the second harmonic in the output signal from the digital divider, and calculating the power or amplitude of a second harmonic for generating the feedback control signal to the polarization controller.

8. The PMD compensation arrangement of claim 1 wherein the compensation control means comprises:

a signal processing control unit responsive to the dithering optical signal received by the PMD compensation arrangement and the first polarized components received on the first output path from the PBS for measuring interference characteristics of the first and second PSPs and generating an output control signal based on the measured interference characteristics; and a driver responsive to the output control signal from the signal processing control unit for generating the feedback control signal to the polarization controller.

9. The PMD compensation arrangement of claim 8 wherein the signal processing control unit is a digital signal processing control unit.

10. The PMD compensation arrangement of claim 9 further comprising:

a first photodiode responsive to the received dithering optical signal received by the PMD compensation arrangement for generating a corresponding electrical output signal;

a first analog-to-digital (A/D) converter for converting the electrical output signal from the first photodiode into a digital output signal;

a second photodiode responsive to the first polarized signals on the first output path from the PBS for generating a corresponding electrical output signal;

a second analog-to-digital (A/D) converter for converting the electrical output signal from the second photodiode into a digital output signal; and a digital divider for separating harmonic distortion of the digital output signal from the first A/D converter which interferes with the digital output signal from the second A/D converter for generating an output control signal containing only the PSP interfering information.

11. The PMD compensation arrangement of claim 10 further comprising:

power or amplitude measuring means for passing only the second harmonic in the output signal from the digital divider, and calculating the power or amplitude of a second harmonic for generating the feedback control signal to the polarization controller.

12. The PMD compensation arrangement of claim 11 wherein the power or amplitude measuring means performs PSP tracking by (a) measuring the power or amplitude of a second harmonic component, (b) saving the calculated value obtained in (a) above, (c) altering the feedback control signal to the polarization controller, (d) measuring the power or amplitude of a second harmonic component as a result of (c) above, and (d) altering the feedback control signal to the polarization controller in a direction to minimize the second harmonic.

13. The PMD compensation arrangement of claim 8 wherein the signal processing control unit measures the interference characteristics between the dithering optical signal received by the PMD compensation arrangement and the first polarized components received on the first output path from the PBS by obtaining a separate set of data of each of the dithering optical signal and the first polarized components from the PBS with a delay of 90 degrees between these two sets of data, multiplying the two sets of data together, and filtering out the DC component of the product for generating the feedback control signal to the polarization controller.

14. The PMD compensation arrangement of claim 1 wherein the PSP component with a larger amplitude is automatically transmitted by the PBS onto the second output path thereof as the output signal from the PMD compensation arrangement.

15. In an optical transmission system, a polarization mode dispersion (PMD) compensation arrangement comprising:

an optical tap responsive to the reception of a dithering optical signal from a remote transmitter including polarization mode dispersion and first and second orthogonal principal states of polarization (PSPs) for directing a first portion of the received dithering optical signal onto a first output path and a second portion of the received dithering optical signal onto a second output path;

a polarization beam splitter (PBS) coupled to receive the second portion of received dithering optical signal from the optical tap, the PBS comprising a first polarization axis for directing first polarized components onto a first output path, and a second polarization axis for directing second orthogonally polarized components onto a second output path for transmission as an output signal from the PMD compensation arrangement; and compensation control means responsive to both the first portion of the received dithering optical signal on the first output path from the optical tap and the first polarized components on the first output path from the PBS for measuring interference characteristics of the two principal states of polarization for aligning each of the principal states of polarization in the received dithering optical signal on the second output path from the optical tap with the corresponding first and second polarization axes of the PBS based on the measured interference characteristics.

16. The PMD compensation arrangement of claim 15 wherein the compensation control means measures the level of second harmonics as the interference characteristics between the received dithering optical signal and the first polarized components received from the PBS for aligning the PSPs with the corresponding first and second polarization axes of the PBS.

17. The PMD compensation arrangement of claim 15 wherein the compensation control means comprises:

a signal processing control unit responsive to both the first portion of the received signal on the first output path from the optical tap and the first polarized signals on the first output path from the PBS for continually measuring the interference characteristics of the first and second principal states of polarization for generating a feedback control driving signal;

a polarization controller located in the second output path from the optical tap for transforming first and second orthogonally polarized PSP components in the optical signal received from the optical tap into first and second linearly polarized components, and for aligning the first and second linearly polarized components to first and second axes, respectively, of the polarization beam splitter (PBS) 24 under the control of the feedback control driving signal from the signal processing control unit.

18. The PMD compensation arrangement of claim 17 wherein the compensation control means comprises:

a signal processing control unit responsive to both the first portion of the received dithering optical signal on the first output path from the optical tap and the first polarized signals on the first output path from the PBS for continually measuring the interference characteristics of the first and second principal states of polarization, and for generating the feedback control driving signal to the polarization controller.

19. The PMD compensation arrangement of claim 17 wherein the compensation control means comprises:

a digital signal processing control unit for generating an output control signal based on the measured interference characteristics of the first and second PSPs in the two received optical signal from the optical tap and the PBS; and a driver responsive to the output control signal from the digital signal processing control unit for generating the feedback control signal to the polarization controller.

20. The PMD compensation arrangement of claim 19 wherein the compensation control means further comprises:

a first photodiode responsive to the first portion of the received dithering optical signal on the first output path from the optical tap for generating a corresponding electrical output signal;

a first analog-to-digital (A/D) converter for converting the electrical output signal from the first photodiode into a digital output signal;

a second photodiode responsive to the first polarized signals on the first output path from the PBS for generating a corresponding electrical output signal;

a second analog-to-digital (A/D) converter for converting the electrical output signal from the second photodiode into a digital output signal; and a digital divider for separating harmonic distortion of the output signal from the first A/D converter which interferes with the output signal from the second A/D converter for generating an output control signal containing only the PSP interfering information.

21. The PMD compensation arrangement of claim 20 wherein the compensation control means further comprises:

power or amplitude measuring means for passing only the second harmonic in the output signal from the digital divider, and calculating the power or amplitude of a second harmonic for generating the feedback control signal to the polarization controller.

22. The PMD compensation arrangement of claim 15 wherein the compensation control means comprises:

a signal processing control unit responsive to the dithering optical signal received by the PMD compensation arrangement and the first polarized components received on the first output path from the PBS for measuring interference characteristics of the first and second PSPs and generating an output control signal based on the measured interference characteristics; and a driver responsive to the output control signal from the signal processing control unit for generating the feedback control signal to the polarization controller.

23. The PMD compensation arrangement of claim 22 wherein the signal processing control unit is a digital signal processing control unit.

24. The PMD compensation arrangement of claim 23 further comprising:

a first photodiode responsive to the received dithering optical signal received by the PMD compensation arrangement for generating a corresponding electrical output signal;

a first analog-to-digital (A/D) converter for converting the electrical output signal from the first photodiode into a digital output signal;

a second photodiode responsive to the first polarized signals on the first output path from the PBS for generating a corresponding electrical output signal;

a second analog-to-digital (A/D) converter for converting the electrical output signal from the second photodiode into a digital output signal; and a digital divider for separating harmonic distortion of the digital output signal from the first A/D converter which interferes with the digital output signal from the second A/D converter for generating an output control signal containing only the PSP interfering information.

25. The PMD compensation arrangement of claim 24 further comprising:

power or amplitude measuring means for passing only the second harmonic in the output signal from the digital divider, and calculating the power or amplitude of a second harmonic for generating the feedback control signal to the polarization controller.

26. The PMD compensation arrangement of claim 25 wherein the power or amplitude measuring means performs PSP tracking by (a) measuring the power or amplitude of a second harmonic component, (b) saving the calculated value obtained in (a) above, (c) altering the feedback control signal to the polarization controller, (d) measuring the power or amplitude of a second harmonic component as a result of (c) above, and (d) altering the feedback control signal to the polarization controller in a direction to minimize the second harmonic.

27. The PMD compensation arrangement of claim 22 wherein the signal processing control unit measures the interference characteristics between the dithering optical signal received by the PMD compensation arrangement and the first polarized components received on the first output path from the PBS by obtaining a separate set of data of each of the dithering optical signal and the first polarized components from the PBS with a delay of 90 degrees between these two sets of data, multiplying the two sets of data together, and filtering out the DC component of the product for generating the feedback control signal to the polarization controller.

28. The PMD compensation arrangement of claim 15 wherein the PSP component with a larger amplitude is automatically transmitted by the PBS onto the second output path thereof as the output signal from the PMD compensation arrangement.

29. A method of providing polarization mode dispersion (PMD) compensation in an optical transmission system comprising the steps of:

(a) receiving a dithering optical signal including first and second orthogonal principal states of polarization (PSPs) that have been subjected to polarization mode dispersion;

(b) transforming the first and second orthogonal (PSPS) in the received dithering optical signal from step (a) into orthogonal first and second linearly polarized components in a polarization controller (PC);

(c) directing all linearly polarized components which are aligned with a first polarization axis of a polarization beam splitter (PBS) to a first optical input of a compensation control means and directing all linearly polarized components which are aligned with a second polarization axis of the polarization beam splitter (PBS) as an optical output signal to a remote user device;

(d) measuring interference characteristics and amplitude fluctuations in polarized components obtained from via the first polarization axis of the PBS in step (c) in the compensation control means for generating a feedback control signal to the PC; and (e) causing the PC to realign the first and second linearly polarized components to match the first and second polarization axes of the PBS in response to the feedback control signal from step (d).

30. The method of claim 29 wherein in performing step (d) performing the substeps of:

(d1) generating an electrical output signal in a first photodiode corresponding to the dithering optical signal received in step (a);

(d2) converting the electrical output signal from the first photodiode into a digital output signal in a first analog-to-digital (A/D) converter;

(d3) generating an electrical output signal in a second photodiode corresponding to an optical signal comprising the linearly polarized components which are received at the first optical input of a compensation control means in step (c);

(d4) converting the electrical output signal from the second photodiode into a digital output signal in a second analog-to-digital (A/D) converter; and (d5) separating harmonic distortion of the output signal from the first A/D converter which interferes with the output signal from the second A/D converter in a digital divider for generating an output control signal containing only the PSP interfering information.

31. The method of claim 30 wherein in performing step (d) performing the further substeps of:

(d6) passing only a second harmonic found in the output control signal from the digital divider in step (d5); and (d7) calculating the power or amplitude of the second harmonic component in a power or amplitude measuring means to perform PSP tracking for generating the feedback control signal to the polarization controller.

32. The method of claim 31 wherein the power or amplitude measuring means performs PSP tracking in performing step (d7) by performing the steps of:

(f) measuring the power or amplitude of the second harmonic component;

(g) saving the calculated value obtained in step (f);

(h) altering the feedback control signal to the polarization controller;

(i) measuring the power or amplitude of a second harmonic component as a result of step (h); and (j) altering the feedback control signal to the polarization controller in a direction to minimize the second harmonic.

33. The method of claim 29 wherein in performing step (d) performing the substeps of:

(d1) measuring the interference characteristics between the dithering optical signal received in step (a) and the linearly polarized components which are received at the first optical input of a compensation control means in step (c) in a signal processing control unit for obtaining a separate set of data of each of the dithering optical signal and the linearly polarized components with a delay of 90 degrees between these two sets of data; and (d2) multiplying the two sets of data together, and filtering out the DC component of the product for generating the feedback control signal to the polarization controller.

34. The method of claim 29 comprising the further step of:

(f) after step (e), automatically transmitting the PSP component with the larger amplitude via the second polarization axis of the PBS.

\* \* \* \* \*